United States Patent
Bidner et al.

(10) Patent No.: US 9,453,439 B2
(45) Date of Patent: Sep. 27, 2016

(54) APPROACH FOR VARIABLE PRESSURE OIL INJECTION

(75) Inventors: David Karl Bidner, Livonia, MI (US); Brad Alan VanDerWege, Canton, MI (US); John Eric Rollinger, Sterling Heights, MI (US); John Smiley, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1174 days.

(21) Appl. No.: 12/873,156

(22) Filed: Aug. 31, 2010

(65) Prior Publication Data

US 2011/0144882 A1 Jun. 16, 2011

(51) Int. Cl.

| F02B 1/00 | (2006.01) |
|---|---|
| F01M 1/08 | (2006.01) |
| F02B 3/06 | (2006.01) |
| F02B 75/02 | (2006.01) |
| F02B 37/00 | (2006.01) |
| F02D 13/02 | (2006.01) |

(52) U.S. Cl.
CPC . F01M 1/08 (2013.01); F02B 3/06 (2013.01); F02B 37/00 (2013.01); F02B 2075/025 (2013.01); F02D 13/0226 (2013.01); Y02T 10/125 (2013.01)

(58) Field of Classification Search
USPC ........... 123/435, 445, 446, 478, 479, 198 D, 123/198 DB, 1 A, 27 A, 406.21, 406.27, 123/406.47; 701/103–105, 107, 111, 112; 73/35.07, 35.09, 35.12, 114.02, 114.07
See application file for complete search history.

(56) References Cited

U.S. PATENT DOCUMENTS

| 3,857,543 A | * | 12/1974 | McKeen | 251/129.06 |
| 4,019,072 A | * | 4/1977 | Mifune et al. | 310/317 |
| 4,290,392 A | * | 9/1981 | Dissmore | 123/1 A |
| 4,399,774 A | * | 8/1983 | Tsutsumi | 123/41.1 |

(Continued)

FOREIGN PATENT DOCUMENTS

| JP | 2005273572 A | 10/2005 |
| JP | 2008038757 A | 2/2008 |

OTHER PUBLICATIONS

Authors Unknown, "Deposit-Induced Runaway Surface Preignition," Industrial Lubrication and Tribology, vol. 14, Issue 10, published 1962, pp. 22-22, 2 pages.

(Continued)

Primary Examiner — Stephen K Cronin
Assistant Examiner — Gonzalo Laguarda
(74) Attorney, Agent, or Firm — Julia Voutyras; Alleman Hall McCoy Russell & Tuttle LLP

(57) ABSTRACT

One example method includes varying oil injection by an oil injector onto a piston of an engine to accommodate different operating conditions. For example, by adjusting oil injection, suitable cooling effects can be provided without providing additional oil that increases the amount of oil deposits in the engine. In this way, the risk of pre-ignition can be reduced.

14 Claims, 4 Drawing Sheets

(56) References Cited

U.S. PATENT DOCUMENTS

| | | | |
|---|---|---|---|
| 4,913,117 A * | 4/1990 | Hashimoto et al. | 123/406.3 |
| 5,174,249 A * | 12/1992 | Katou | 123/41.38 |
| 5,477,820 A | 12/1995 | Rao | |
| 6,067,956 A | 5/2000 | Motose et al. | |
| 6,397,796 B1 | 6/2002 | Styron et al. | |
| 7,222,607 B2 * | 5/2007 | Hernandez | 123/406.37 |
| 7,275,519 B2 | 10/2007 | Miyazaki et al. | |
| 8,256,388 B2 * | 9/2012 | Aixala | 123/41.35 |

OTHER PUBLICATIONS

Partial Translation of Sun, YongSheng et al., "Dectection and Prevention of Engine Abnormal Combustion," Science & Technology Information, Issue 25, published Sep. 5, 2009, relevant p. 76 in original text document, 5 pages.

Partial Translation of Office Action of Chinese Application No. 201110225403.2, Issued Dec. 3, 2014, State Intellectual Property Office of PRC, 8 Pages.

* cited by examiner

APPROACH FOR VARIABLE PRESSURE OIL INJECTION

BACKGROUND AND SUMMARY

Piston cooling jets or oil injectors may be implemented in an engine to provide engine cylinder cooling. In particular, each oil injector sprays oil onto an underside of a corresponding piston to create a cooling effect on the piston. Furthermore, the oil propagates from the underside of the piston to the surrounding walls of a corresponding engine cylinder as the piston reciprocates in the engine cylinder to provide a cooling effect to the combustion chamber. In one example, operation of an oil injector occurs when the oil pressure in the engine is sufficient to overcome a pressure level of a check valve in the oil injector assembly. As long as the oil pressure is greater than the pressure level of the check valve the injector injects oil onto the piston.

However, the inventors have recognized several potential issues with such a configuration. For example, since operation of the oil injector is merely based on the pressure setting of the check valve in the oil injector assembly, the amount of oil that is injected by the oil injector cannot be adjusted to accommodate different operating conditions. In one example, if the check valve pressure level is set too high, then the oil injector operates less frequently and cooling is reduced resulting in increased engine knock that reduces drivability or pre-ignition that degrades the engine.

In another example, if the check valve pressure level is set too low, then the oil injector operates more frequently and additional oil above and beyond what is suitable for engine cylinder cooling is provided to the engine cylinder. The additional oil increases oil consumption and forms more oil deposits in the combustion chamber. The oil deposits have an insulating effect that slows the transfer of heat away from the combustion chamber and contributes to engine knock and/or pre-ignition.

In one example, the above mentioned issues may be addressed by a method for operating an engine including an oil injector injecting oil onto a piston of the engine, comprising, adjusting oil injection in response to an indication of pre-ignition. By adjusting oil injection, suitable cooling effects can be provided without providing additional oil that increases the amount of oil deposits in the engine. In this way, the risk of pre-ignition can be reduced.

Moreover, this approach allows for oil injection to be controlled more precisely than mere binary operation of previous implementations. As such, oil injection can be adjusted differently to accommodate different operating conditions. For example, oil injection can be adjusted by a first amount in response to an indication of pre-ignition and oil injection can be adjusted by a second amount different from the first amount in response to an indication of engine knock.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

The subject matter of the present disclosure is now described by way of example and with reference to certain illustrated embodiments. It will be noted that figures included in this disclosure are schematic, and are identified as such. In the schematic figures, views of the illustrated embodiments are generally not drawn to scale; aspect ratios, feature size, and numbers of features may be purposely distorted to make selected features or relationships easier to see.

Figure 1:
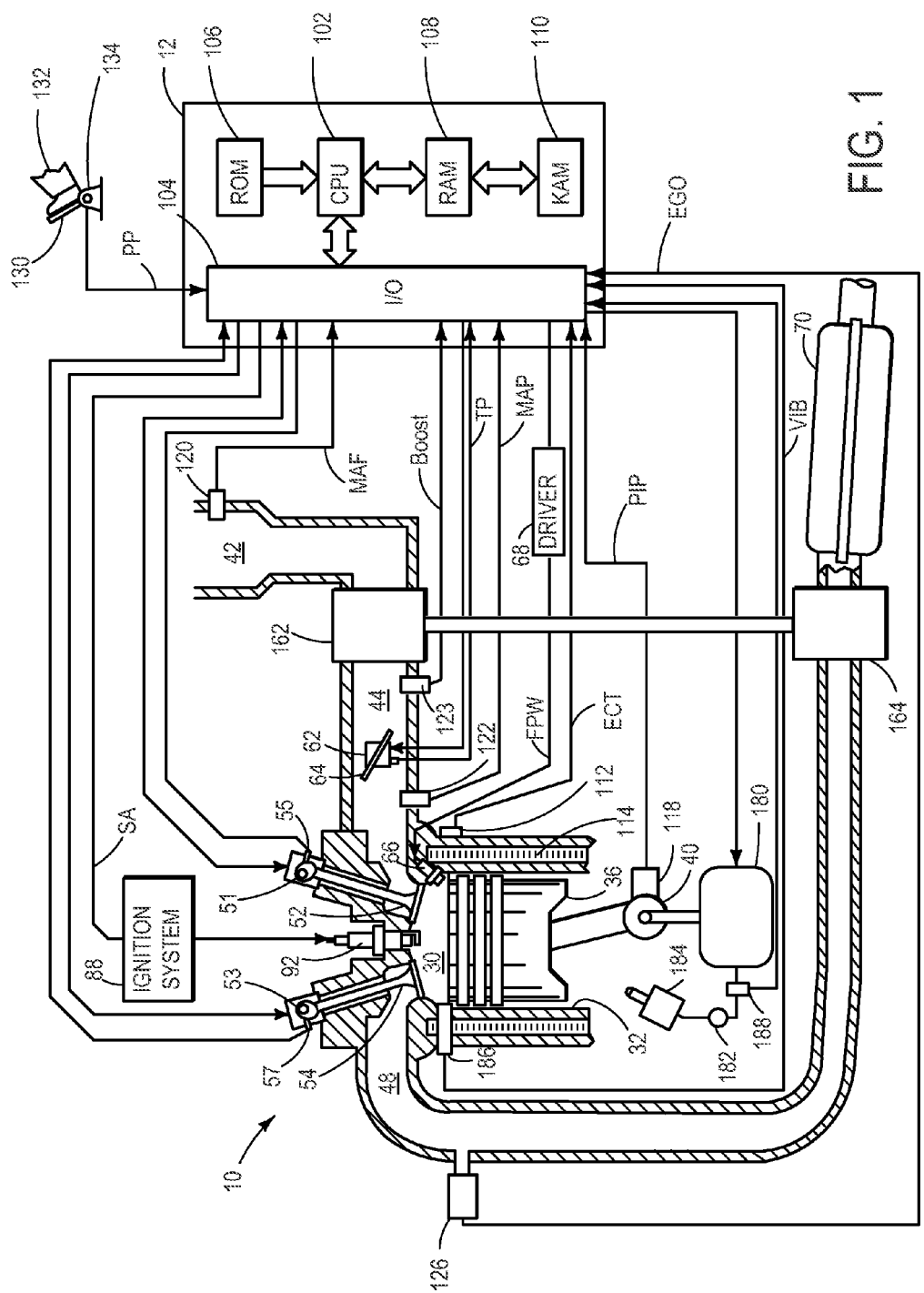
FIG. 1 shows an example embodiment of an engine system of the present disclosure.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. For example, valve operation may be varied as part of pre-ignition abatement or engine knock abatement operations. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Engine 10 may further include a compression device such as a turbocharger or supercharger including at least a compressor 162 arranged along intake manifold 44. For a turbocharger, compressor 162 may be at least partially driven by a turbine 164 (e.g. via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. A boost sensor 123 may be positioned downstream of the compressor in intake manifold 44 to provide a boost pressure (Boost) signal to controller 12.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30. Fuel injector 66 may be controlled to vary fuel injection in different cylinder according operating conditions. For example, controller 12 may command fuel injection to be stopped in one or more cylinders as part of pre-ignition abatement operations so that combustion chamber 30 is allowed to cool. Further, intake valve 52 and/or exhaust valve 53 may be opened in conjunction with the stoppage of fuel injection to provide intake air for additional cooling.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Controller 12 may vary signal SA based on operating conditions. For example, controller may retard signal SA in order to retard spark in response to an indication of engine knock as part of engine knock abatement operations. Though spark ignition components are shown, in some embodiments, combustion chamber 30 or one or more other combustion chambers of engine 10 may be operated in a compression ignition mode, with or without an ignition spark.

Variable flow oil pump 180 can be coupled to crankshaft 40 to provide rotary power to operate the variable flow oil pump 180. In one example, the variable flow oil pump 180 includes a plurality of internal rotors (not shown) that are eccentrically mounted. At least one of the internal rotors can be controlled by controller 12 to change the position of that rotor relative to one or more other rotors to adjust an output flow rate of the variable flow oil pump 180 and thereby adjusted the oil pressure. For example, the electronically controlled rotor may be coupled to a rack and pinion assembly that is adjusted via the controller 12 to change the position of the rotor. The variable flow oil pump 180 may selectively provide oil to various regions and/or components of engine 10 to provide cooling and lubrication. The output flow rate or oil pressure of the variable flow oil pump 180 can be adjusted by the controller 12 to accommodate varying operating conditions to provide varying levels of cooling and/or lubrication. Further, the oil pressure output from the variable flow oil pump 180 may be adjusted to reduce oil consumption and/or reduce energy consumption by the variable flow oil pump 180.

It will be appreciated that any suitable variable flow oil pump configuration may be implemented to vary the oil pressure and/or oil flow rate. In some embodiments, instead of being coupled to the crankshaft 40 the variable flow oil pump 180 may be coupled to a camshaft, or may be powered by a different power source, such as a motor or the like.

Oil injector 184 may be coupled downstream of an output of the variable flow oil pump 180 to selectively receive oil from the variable flow oil pump 180. In some embodiments, the oil injector 184 may be incorporated into the combustion chamber walls 32 of the engine cylinder and may receive oil from galleries formed in the walls. The oil injector 184 may be operable to inject oil from the variable flow oil pump 180 onto an underside of piston 36. The oil injected by oil injector 184 provides cooling effects to the piston 36. Furthermore, through reciprocation of piston 36, oil is drawn up into combustion chamber 30 to provide cooling effects to walls of the combustion chamber 30.

A valve 182 may be positioned between the output of the variable flow oil pump 180 and the oil injector 184 to control flow of oil to the oil injector 184. In some embodiments, the valve 182 may be a check valve that is set to open at a predefined pressure or temperature level at which operation of the oil injector 184 is desired to provide cooling effects. In some embodiments, the check valve may be integrated in to the assembly of the oil injector 184

In some embodiments, the valve 182 may be an electronically actuatable valve that is controlled by controller 12. The valve 182 may be actuatable to provide oil to the oil injector 184 in response to an indication of pre-ignition or engine knock in the combustion chamber 30. Correspondingly, the valve 182 may be actuatable to stop injection of oil by the oil injector in response an operating condition, such as a cylinder temperature becoming less than a threshold at which cooling effects are less desired than reduced oil consumption and/or oil deposits in the combustion chamber.

Vibration sensor (e.g., accelerometer) 186 is shown positioned in combustion chamber wall 32. The vibration sensor 186 provides an indication of vibration (VIB) in the combustion chamber to the controller 12. The vibration sensor 186 may be used to determine an indication of pre-ignition or engine knock in the combustion chamber 30. For example, the indication of pre-ignition may be determined from larger vibrations that occur earlier in the engine cycle prior to spark and the indication of engine knock may be determined from smaller vibrations that occur later in the engine cycle subsequent to spark. Although a vibration sensor is provided as an example to determine an indication of pre-ignition and/or engine knock, it will be appreciated that any suitable sensor may be used to provide an indication of pre-ignition or engine knock.

The controller 12 may adjust operation of the variable flow oil pump 180 in response to receiving an indication of pre-ignition or an indication of engine knock from the vibration sensor 186. For example, the controller may adjust oil output from the variable flow oil pump 180 to adjust oil injection of the oil injector 184 to be injected onto the piston 36. More particularly, oil injection may be adjusted to a first amount in response to the indication of pre-ignition and adjusted to a second amount that is different from the first amount in response to the indication of engine knock. For example, oil injection may be increased to a higher flow rate or injection pressure in response to the indication of pre-ignition to provide greater cooling since pre-ignition can occur at higher temperatures. In this way, a greater cooling effect may be provided to reduce the risk of further pre-ignition in the combustion chamber 30.

Exhaust gas sensor 126 is shown coupled to exhaust passage 48 upstream of emission control device 70. Sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air-fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Furthermore, controller 12 may receive signals that may be indicative of pre-ignition or engine knock in the combustion chamber 30. For example, engine coolant temperature (ECT) from temperature sensor 112 coupled to cooling sleeve 114 may be sent to controller 12 to indicate whether or not the temperature of the combustion chamber is in range in which pre-ignition may occur. Controller 12 may adjust oil injection in response to an indication of pre-ignition that includes an engine temperature being greater than a threshold. Additionally or alternatively, vibration sensor 186 may send a signal indicating pre-ignition in response to detecting vibrations that correspond a vibration profile of pre-ignition (e.g., higher amplitude, occur earlier in the engine cycle, etc.). Controller 12 may receive an indication of oil pressure from pressure sensor 188 positioned down stream of the output of the variable flow oil pump 180. The oil pressure indication may be used by the controller 12 to control adjustment of oil pressure by varying oil flow rate output from the oil pump.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, oil injector etc.

The configurations illustrated above enable various methods for varying injection pressure of oil injected by the oil injector. Accordingly, some such methods are now described, by way of example, with continued reference to above configurations. It will be understood, however, that these methods, and others fully within the scope of the present disclosure, may be enabled via other configurations as well.

It will be understood that the example control and estimation routines and methods disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Figure 2:
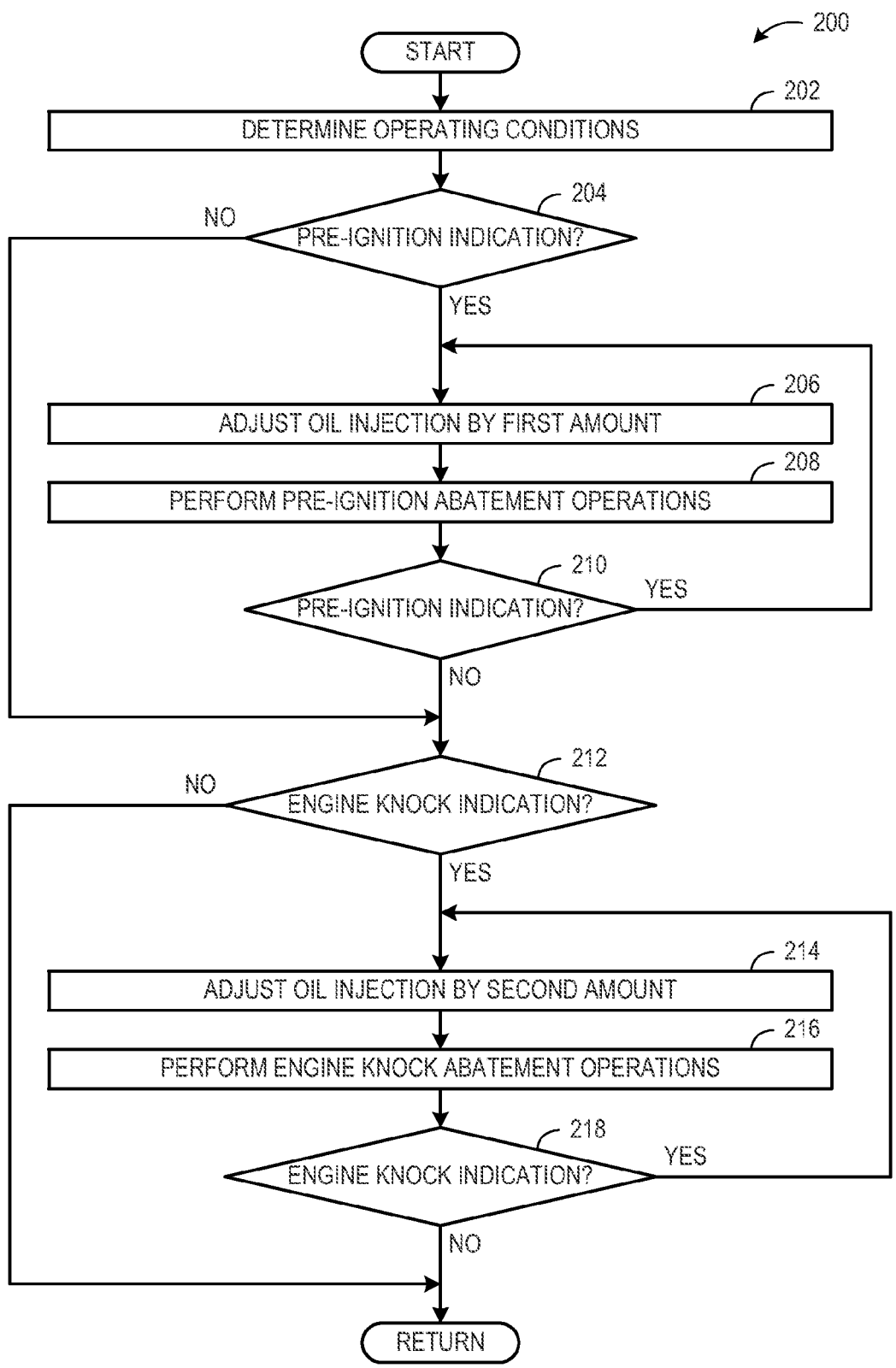
FIG. 2 shows an example embodiment of a method for controlling oil injection to accommodate different operating conditions.

FIG. 2 shows an example embodiment of a method 200 for controlling oil injection to accommodate different operating conditions. In one example, the method 200 may be performed by controller 12 shown in FIG. 1. At 202, the method may include determining operating conditions. Determining operating conditions may include receiving information from various components of engine 10. For example, the controller 12 may receive operating state information of the variable flow oil pump 180, such as an output flow rate or oil pressure setting, operating state information of various valves including valve 182, etc. Furthermore, determining operating condition may include monitoring various parameters of engine 10 or receiving signals from various sensors coupled to engine 10. The parameters monitored may include, for example, engine/cylinder temperature, cylinder pressure, engine oil temperature, engine oil pressure, engine/cylinder vibrations, etc.

At 204, the method may include determining if an indication of pre-ignition exists or has occurred. Pre-ignition may occur in an engine cylinder during particular operating conditions. Thus, in some embodiments, the pre-ignition indication my include determining if operating parameters received from different sensors match the operating conditions. As an example, pre-ignition may occur in a particular engine temperature range. Accordingly, determining if an indication of pre-ignition exists may include determining if an engine temperature is greater than a temperature threshold or has entered the particular temperature range at which pre-ignition occurs. As another example, determining if an indication of pre-ignition exists may include receiving a signal indicating an engine/cylinder vibration is greater than a threshold. Further, engine/cylinder vibration may indicate pre-ignition if it occurs before spark earlier in the engine cycle. If it is determined that an indication of pre-ignition exists the method moves to 206. Otherwise, the method moves to 212.

At 206, the method may include adjusting oil injection by the oil injector. The oil injection may be adjusted by a first amount to provide suitable enough cooling to abate pre-ignition. In some cases, oil injection may be adjusted by adjusting oil pressure. In some cases, oil injection may be adjusted by adjusting a flow rate. In some embodiments, adjusting oil injection by the oil injector 184 may include adjusting operation of the variable flow oil pump 180 to adjust the oil pressure or flow rate of oil supplied to the oil injector. More particularly, the output flow rate of the variable flow oil pump may be increased to increase the oil pressure supplied to the oil injector to thereby increase the amount of oil injected by the oil injector onto the piston. Optionally or additionally, adjusting oil injection may include adjusting a state of a valve between the oil injector 184 and the variable flow oil pump 180 to adjust oil injection.

It will be appreciated that adjusting the injection pressure of oil injected by the oil injector may include increasing injection pressure from a first pressure level to a second pressure level that is higher than the first pressure level. Such conditions may occur where the oil injector is operating to inject a suitable amount of oil for piston/cylinder cooling without providing additional oil so as to reduce the likelihood of forming oil deposits in the combustion chamber. Subsequently, engine operating conditions may change to create an indication of pre-ignition, for example, an increase in engine speed that correspondingly causes an increase in cylinder temperature. In response to the increase in cylinder temperature, the injection pressure or flow rate of oil injected by the oil injector is increased from the first pressure level to the second pressure level to provide a greater cooling effect to the piston/cylinder to thereby reduce the risk of pre-ignition in the cylinder.

At 208, the method may include performing pre-ignition abatement operations. As one example, pre-ignition abatement operations may include adjusting air-fuel ratio rich so that the additional liquid can provide greater cylinder cooling. As another example, pre-ignition abatement operations may include stopping fuel injection to stop combustion. Correspondingly, valves may be opened to provide intake air for cylinder cooling. Further, pre-ignition abatement operation may include any suitable operation to provide combustion chamber cooling to reduce the risk of pre-ignition.

At 210, the method may include determining if an indication of pre-ignition conditions exists. If it is determined that an indication of pre-ignition exists the method returns to 206. Otherwise the method moves to 212.

At 212, the method may include determining if an indication of engine knock exists. As an example, an indication of engine knock may include a vibration greater than a threshold. The threshold for engine knock vibration may be lower than a threshold for pre-ignition vibration. Further, engine knock vibration may occur after spark later in the engine cycle, whereas pre-ignition vibration occurs prior to spark. If it is determined that an indication of engine knock exists the method moves to 214. Otherwise the method returns to other operations.

At 214, the method may include adjusting oil injection by the oil injector. The oil injection may be adjusted by a second amount that is different from the first amount (for pre-ignition) to provide suitable enough cooling to abate engine knock. In some cases, oil injection may be adjusted by adjusting oil pressure. In some cases, oil injection may be adjusted by adjusting a flow rate. In some embodiments, adjusting oil injection by the oil injector 184 may include adjusting operation of the variable flow oil pump 180 to adjust the oil pressure or flow rate of oil supplied to the oil injector. Optionally or additionally, adjusting oil injection may include adjusting a state of a valve between the oil injector 184 and the variable flow oil pump 180 to adjust oil injection. In cases, oil injection may include stopping oil injection by actuating valve 184. In some cases, oil injection may be stopped in favor of other engine knock abatement operations.

At 216, the method may include performing engine knock abatement operations. As an example, an engine knock abatement operation may include retarding spark in order to more fully combust fuel and/or exhaust gas in the combustion chamber.

At 218, the method may include determining if an indication of engine knock exists. If an indication of engine knock exists the method returns to 214. Otherwise the method returns to other operations.

By adjusting oil injection based on an indication of pre-ignition and/or engine knock, an amount of oil can be provided to suitably cool the piston/cylinder while not providing additional or excess oil that creates oil deposits in the combustion chamber. In this way, the risk of pre-ignition in the combustion chamber can be reduced. Moreover, if oil injection is adjusted by merely varying the output flow rate of the variable flow oil pump, no additional parts are needed for additional injection pressure control. In this way, manufacturing and/or maintenance costs can be reduced.

Figure 3:
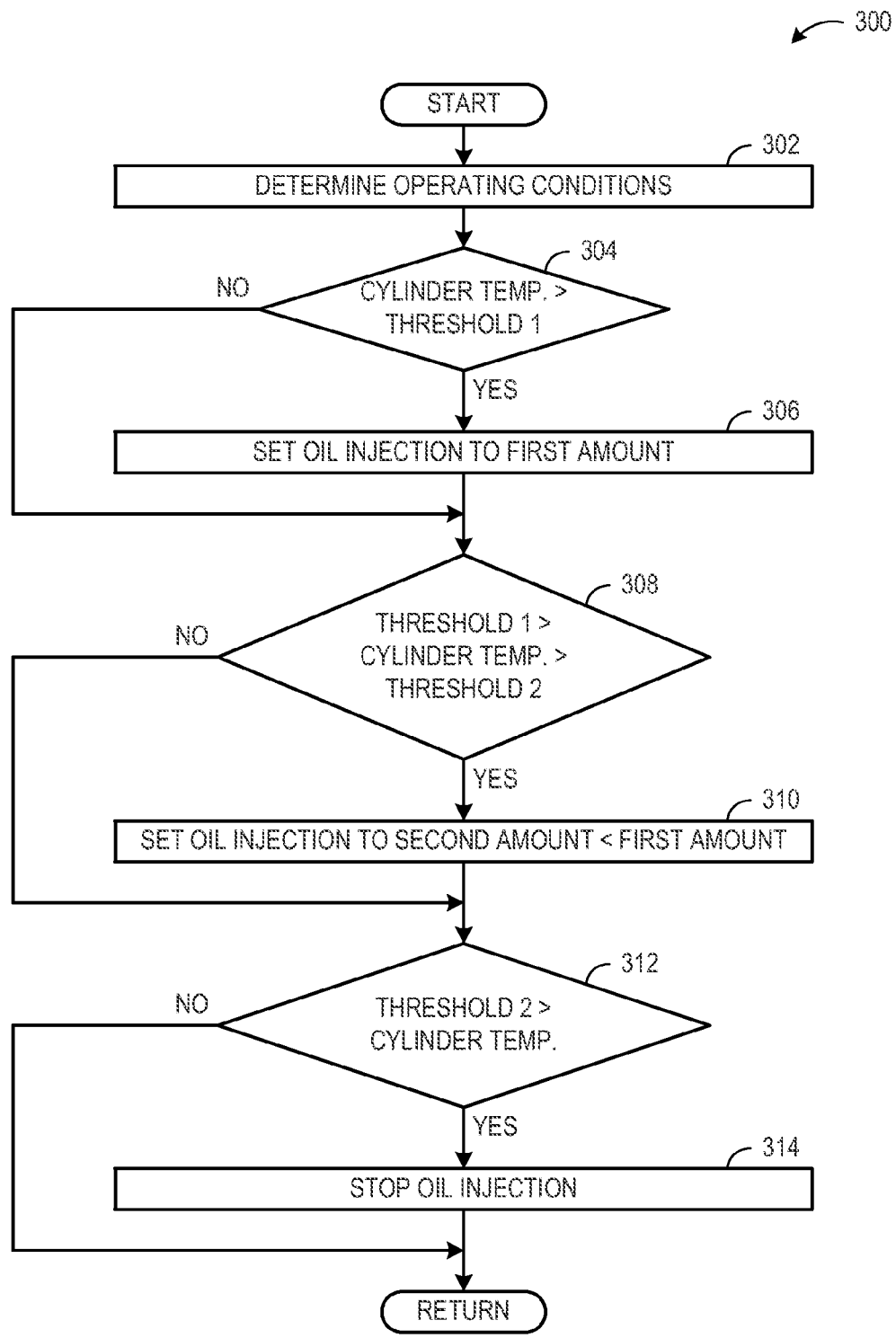
FIG. 3 shows an example embodiment of a method for controlling oil injection based on engine cylinder temperature to accommodate different operating conditions.

FIG. 3 shows an example embodiment of a method 300 for controlling oil injection based on an engine parameter, more particularly, engine cylinder temperature to accommodate different operating conditions. In one example, the method 300 may be performed by controller 12 shown in FIG. 1. At 302, the method may include determining operating conditions. At 304, the method may include determining if a cylinder temperature is greater than a first threshold. In one example, the determination may be made based on a temperature signal received from temperature sensor 112. The first threshold may be a predetermined temperature at which pre-ignition is likely to occur. In some embodiments, the first threshold defines a lower boundary of an upper temperature range at which pre-ignition is likely or most likely to occur. In some embodiment, the first threshold may be a temperature that corresponds to a pressure that is higher than a check valve actuation pressure of the oil injector assembly. In other words, the oil injector may be already injecting oil and the injection pressure is increased, as opposed to switching from not injecting oil (e.g., off) to injection oil (e.g., on). If it is determined that the cylinder temperature is greater than the first threshold the method moves to 306. Otherwise the method moves to 308.

At 306, the method may include setting oil injection to a first amount. In some cases, setting the oil injection to the first amount may include adjusting an oil pressure. In some cases, setting the oil injection to the first amount may include adjusting a flow rate of oil injection. Setting oil injection to the first amount may include increasing the output flow or pressure of the variable flow oil pump 180. Since operating conditions exist where pre-ignition is likely or most likely to occur (e.g., the upper temperature range), in some embodiments the injection pressure may be increased to a higher or greatest suitable injection pressure to provide a higher or greatest suitable cooling effect. Although it will be appreciated that the injection pressure can be increased while not reaching the greatest suitable injection pressure to provide suitable cooling to the piston/cylinder during such conditions. Furthermore, the injection pressure may be adjusted within the upper temperature range to provide suitable cooling (e.g., increase injection pressure as cylinder temperature increases).

At 308, the method may include determining if the cylinder temperature is less than the first threshold and greater than a second threshold that is less than the first threshold. The second threshold may be a predetermined temperature at which pre-ignition may occur. In some cases, the second threshold may be a temperature at which pre-ignition is less likely to occur than at the first threshold temperature. Further, in some embodiments the second threshold defines a lower boundary and the first threshold defines an upper boundary of a middle temperature range where suitable cooling can be provided with a decreased amount of oil injected onto the piston/cylinder relative to the upper temperature range above the first threshold. If it is determined that the cylinder temperature is less than the first threshold and greater than the second threshold the method moves to 310. Otherwise the method moves to 312.

At 310, the method may include setting oil injection by the oil injector to a second amount that is less than the first amount. Setting oil injection at the second amount may include adjusting the output flow rate or oil pressure of the variable flow oil pump 180. Further, setting oil injection to the second amount may include adjusting a state of valve 182. Since the cylinder temperature is lower, less oil can be used while still providing suitable cooling to reduce the likelihood of pre-ignition in the combustion chamber. As such, the injection pressure or flow rate and correspondingly the amount of oil injected onto the piston/cylinder by the oil injector can be decreased to decrease oil consumption and reduce the likelihood of oil deposits forming in the combustion chamber.

At 312, the method may include determining if a cylinder temperature is less than the second threshold. In some embodiments, the second threshold defines an upper boundary of a lower temperature range where pre-ignition does not occur because the combustion chamber is not hot enough. If it is determined that the cylinder temperature is less than the second threshold the method moves to 314. Otherwise the method returns to other operations.

At 314, the method may include stopping oil injection by the oil injector. Stopping oil injection may include actuating a valve. In some embodiments, the valve may be a check valve positioned within the oil injector assembly. In some embodiments, the valve may be a valve located upstream of the oil injector positioned between the variable flow oil pump 180 and the oil injector 184. In some embodiments, the valve may be a check valve. In some embodiments, the valve may be an electronic solenoid valve.

The above method may be performed to fine tune oil injection to meet various operating conditions. More particularly, when the cylinder temperature is in a first or upper temperature range where pre-ignition is more likely to occur, the injection pressure can be increased or set to a first or higher amount for greater cooling. Further, when the cylinder temperature is in a second temperature range that is lower than the first temperature range where less oil can be used to provide suitable cooling, the injection pressure can be decreased or set to a second amount that is less than the first amount. The second amount of oil injection provides a suitable cooling while reducing oil consumption and reducing the likelihood of oil deposits in the combustion chamber. Oil consumption is further reduced by stopping oil injection when the cylinder temperature enters a third or lower temperature range where pre-ignition does not occur.

Figure 4:
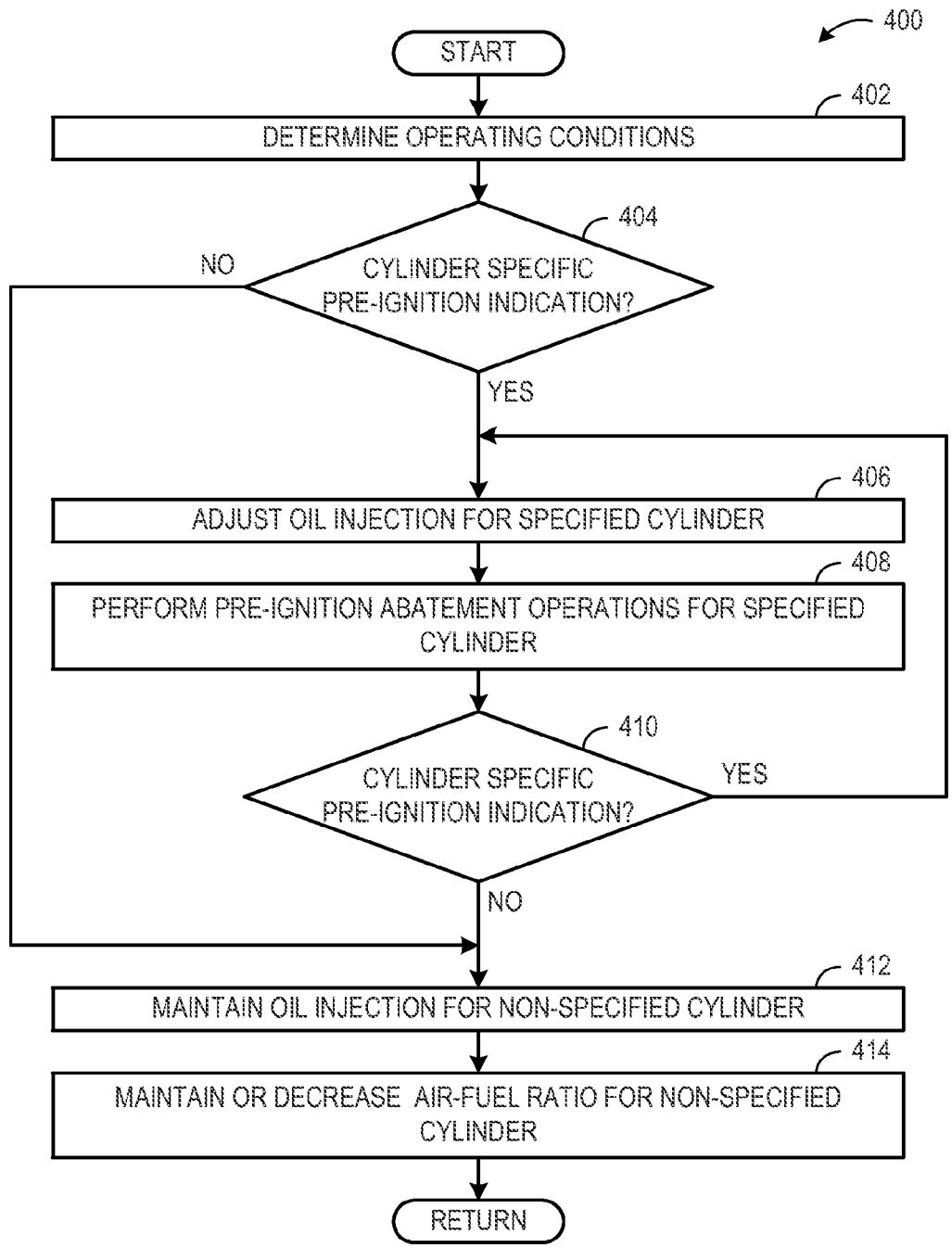
FIG. 4 shows an example embodiment of a method for controlling cylinder-specific oil injection on cylinder-specific operating conditions.

FIG. 4 shows an example embodiment of a method 400 for controlling cylinder-specific oil injection on cylinder-specific operating conditions. In one example, the method 400 may be performed by controller 12 shown in FIG. 1. At 402, the method may include determining operating conditions. At 404, the method may include determining if a cylinder-specific indication of pre-ignition exists. In one example, the determination may be made based on a temperature signals received from different temperature sensors coupled to each cylinder of the engine. As another example, the determination may be made based on cylinder-specific vibration signals sent from a vibration sensor. If it is determined that a cylinder-specific indication of pre-ignition exists the method moves to 406. Otherwise, the method moves to 412.

At 406, the method may include adjusting oil injection for the cylinder specified as having an indication of pre-ignition. In some cases, oil injection may be adjusted for some or all cylinders that are specified as having an indication of pre-ignition.

At 408, the method may include performing pre-ignition abatement operations for the cylinder specified as having an indication of pre-ignition. In some cases, pre-ignition abatement operation may be performed for some or all cylinders that are specified as having an indication of pre-ignition.

At 410, the method may include determining if a cylinder specific indication of pre-ignition exists. If it is determined that a cylinder specific indication of pre-ignition exists the method returns to 406. Otherwise the method moves to 412.

At 412, the method may include maintaining oil injection for oil injectors of cylinders that are not specified as having an indication of pre-ignition. Maintaining oil injection may include not adjusting oil injection for the oil injectors of the cylinders that are not specified as having an indication of pre-ignition. In some cases, maintaining oil injection may include keeping oil injection at a set amount, oil pressure, and/or flow rate. In some cases, maintaining oil injection may include leaving one or more oil injectors turned off.

At 414, the method may include maintaining or decreasing an air-fuel ratio of the cylinders that are not specified as having an indication of pre-ignition. In some cases, the air/fuel ratio may be kept the same. In some cases, the air/fuel ratio may be adjusted lean to compensate for rich air/fuel adjustment in the specified cylinder as part of pre-ignition abatement operations.

By performing oil injection control and pre-ignition abatement on a per cylinder and/or oil injector basis, operation can be fine tuned on an individual level to accommodate the particular operating conditions of each cylinder. Further, it will be appreciated that in some embodiments the above method may be adapted to provide cylinder specific engine knock abatement operations.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A method for operating an engine including an oil injector injecting oil onto a piston of the engine, comprising,
    adjusting oil injection by a first amount in response to an indication of pre-ignition from engine vibration occurring before spark in an engine cycle, and
    adjusting oil injection by a second, different, amount in response to an indication of engine knock occurring after spark in the engine cycle.

2. The method of claim 1, wherein adjusting oil injection includes adjusting a flow rate of oil injection.

3. The method of claim 1, wherein adjusting oil injection includes adjusting an injection pressure of oil injection.

4. The method of claim 1, wherein the engine includes a variable flow oil pump, and wherein adjusting oil injection includes adjusting operation of the variable flow oil pump to adjust oil injection.

5. The method of claim 1, wherein the indication of pre-ignition includes engine vibration being greater than a threshold.

6. The method of claim 1, wherein the indication of pre-ignition includes an engine temperature being greater than a threshold.

7. The method of claim 1, further comprising:
    adjusting an air-fuel ratio of the engine rich in response to the indication of pre-ignition.

8. The method of claim 1, further comprising:
    stopping fuel injection to one or more cylinders of the engine in response to the indication of pre-ignition.

9. The method of claim 1, wherein adjusting oil injection includes setting oil injection at the first amount in response to an operating parameter being greater than a first threshold, setting oil injection at the second amount that is less than the first amount in response to the operating parameter being between the first threshold and a second threshold that is less than the first threshold, and stopping oil injection in response to the operating parameter being less than the second threshold.

10. The method of claim 1, wherein the engine includes a plurality of oil injectors each injecting oil onto a corresponding piston of the engine, the method further comprising:
    adjusting oil injection of one of the plurality of oil injectors in response to a cylinder-specific indication of pre-ignition; and
    maintaining oil injection of another one of the plurality of oil injectors corresponding to a cylinder without pre-ignition.

11. A method for operating an engine including an oil injector injecting oil onto a piston of the engine, comprising,
    adjusting oil injection by a first amount in response to an indication of pre-ignition; and
    adjusting oil injection by a second amount different from the first amount in response to an indication of engine knock, wherein the indication of pre-ignition includes a first engine vibration that is greater than a first threshold, and wherein the indication of engine knock includes a second engine vibration, occurring after the first vibration in an engine cycle, that is greater than a second threshold, the second threshold less than the first threshold.

12. The method of claim 11, wherein the first amount is greater than the second amount.

13. The method of claim 11, wherein adjusting oil injection includes adjusting at least one of a flow rate and an injection pressure of oil injection.

14. The method of claim 11, wherein the engine includes a variable flow oil pump, and wherein adjusting oil injection includes adjusting operation of the variable flow oil pump to adjust oil injection.

* * * * *